T. J. Tolly.

Loading Hay.

Original Patent ~~[illegible]~~

#38,868

Addl. Impt Patented Sept. 4 1860.

No 296.

AT 296

Fig. 1.

Fig. 2.

Fig. 3.

Fig. 4.

Witnesses:
Octavius Knight
Newton M. Champion

Knight Brothers
Attys for T. J. Tolly

THE NATIONAL ARCHIVES
NATIONAL ARCHIVES AND RECORDS SERVICE
GENERAL SERVICES ADMINISTRATION

UNITED STATES PATENT OFFICE.

THOMAS J. JOLLY, OF OLEAN, INDIANA.

IMPROVEMENT IN MACHINES FOR LOADING HAY.

Specification forming part of Additional Improvement No. 296, dated September 4, 1860, to Letters Patent No. 28,868, dated June 26, 1860.

*To all whom it may concern:*

Be it known that I, THOMAS J. JOLLY, of Olean, Ripley county, Indiana, have invented certain new and useful Improvements on my "Improvement in Loading Hay," patented June 26, 1860; and I do hereby declare the following to be a full, clear, and exact description thereof, reference being had to the accompanying drawings, making part of this specification.

My present improvement relates to making the collecting or gathering prongs in sliding sections, so that they may follow or adjust themselves to irregularities of ground over which the machine is passing.

In the accompanying drawings, Figure 1 is a perspective view of one of the sliding curved prongs; Fig. 2, a cross-section of the same. Fig. 3 is a longitudinal section of the machine-frame, showing position of prongs as applied. Fig. 4 is a perspective view of the machine-frame with the elevator-floor strips attached.

The prongs F (one of which is clearly represented in Fig. 1) are made in two sections, *f f'*, the lower ones, *f'*, sliding in suitable curved grooves in the sections *f*, which latter are permanently secured to the machine-frame. Pins *g*, which pass through slots in section *f* into sliding sections *f'*, connect the sections together, allowing freedom to slide. This sliding device permits each prong independently of the rest to follow the undulations of the ground over which it traverses, and thus serve the purpose of gathering the hay for the elevator more completely than the unyielding prong.

For the purpose of preventing the short hay from falling through the elevator, I attach strips of wood L to the elevator-floor frame *d' d'* in the spaces between the toothed elevater-rods, as shown in Fig. 4.

The following is what I claim as of my invention herein, as an addition to my aforesaid improvement in loading hay:

The sectional gathering-teeth F, constructed of stationary sections *f* and sliding sections *f'*, combined and operating in a machine for loading hay, in the manner and for the purpose set forth.

In testimony of which invention I hereunto set my hand.

THOS. J. JOLLY.

Witnesses:

GEO. H. KNIGHT,

B. G. WING.